United States Patent [19]

Haraguchi et al.

[11] Patent Number: 4,629,301
[45] Date of Patent: Dec. 16, 1986

[54] CAMERA HAVING A MOTOR WINDING MECHANISM

[75] Inventors: Shosuke Haraguchi, Kanagawa; Yoichi Tosaka, Tokyo, both of Japan

[73] Assignee: Canon Kabushiki Kaisha, Tokyo, Japan

[21] Appl. No.: 726,183

[22] Filed: Apr. 23, 1985

Related U.S. Application Data

[63] Continuation of Ser. No. 457,472, Jan. 12, 1983, abandoned.

[30] Foreign Application Priority Data

Jan. 20, 1982 [JP] Japan ..................... 57-6999

[51] Int. Cl.⁴ .............................................. G03B 1/12
[52] U.S. Cl. .................................. 354/173.1; 354/214
[58] Field of Search ................ 354/288, 173.1, 173.11, 354/152, 204, 206, 212–214, 216, 226

[56] References Cited

U.S. PATENT DOCUMENTS

| 1,828,205 | 10/1931 | Schmitt et al. | 354/213 |
| 3,098,418 | 7/1963 | Reiher et al. | 354/212 X |
| 3,485,156 | 12/1969 | Takahashi et al. | 354/214 |
| 4,229,093 | 10/1980 | Koyama et al. | 354/226 X |

FOREIGN PATENT DOCUMENTS

| 1147473 | 4/1963 | Fed. Rep. of Germany | 354/173.1 |
| 356018 | 9/1961 | Switzerland | 354/212 |

Primary Examiner—Michael L. Gellner
Attorney, Agent, or Firm—Toren, McGeady, Stanger, Goldberg & Kiel

[57] ABSTRACT

A camera having a built-in winding unit wherein at least a sprocket and a spool of the winding mechanism are provided on a first base plate and a space is formed between the first base plate and second base plate, whereby a part of the winding mechanism is built into this space.

2 Claims, 2 Drawing Figures

CAMERA HAVING A MOTOR WINDING MECHANISM

This is a continuation of application Ser. No. 457,472, filed Jan. 12, 1983, now abandoned.

BACKGROUND OF THE INVENTION

1. Field of the Invention

The present invention relates to a camera having a winding part constructed as a unit.

2. Description of the Prior Art

Although until now the mechanism of a camera can be said to have reached a considerably high level with regard to its capabilities, the mechanism itself consists of various independent parts so that many things may still be improved from the point of the manufacturing assembly process. Especially, the sprocket and the spool of the winding mechanism are inserted from a side of the camera and fixed by shafts from above and beneath, thereby necessitating time-consuming operations.

It is, accordingly, an object of the present invention to provide a camera which can be assembled easily, and for this purpose, the sprocket and the spool are mounted on the base plate, thus forming a winding unit.

Further, other features and objects of the present invention will be clear from the following description taken with reference to the accompanying drawings of a preferred embodiment of the invention.

DESCRIPTION OF THE DRAWINGS

FIG. 1 is a perspective view showing an embodiment of the present invention;

DETAILED DESCRIPTION OF THE PREFERRED EMBODIMENT

Figure 1:
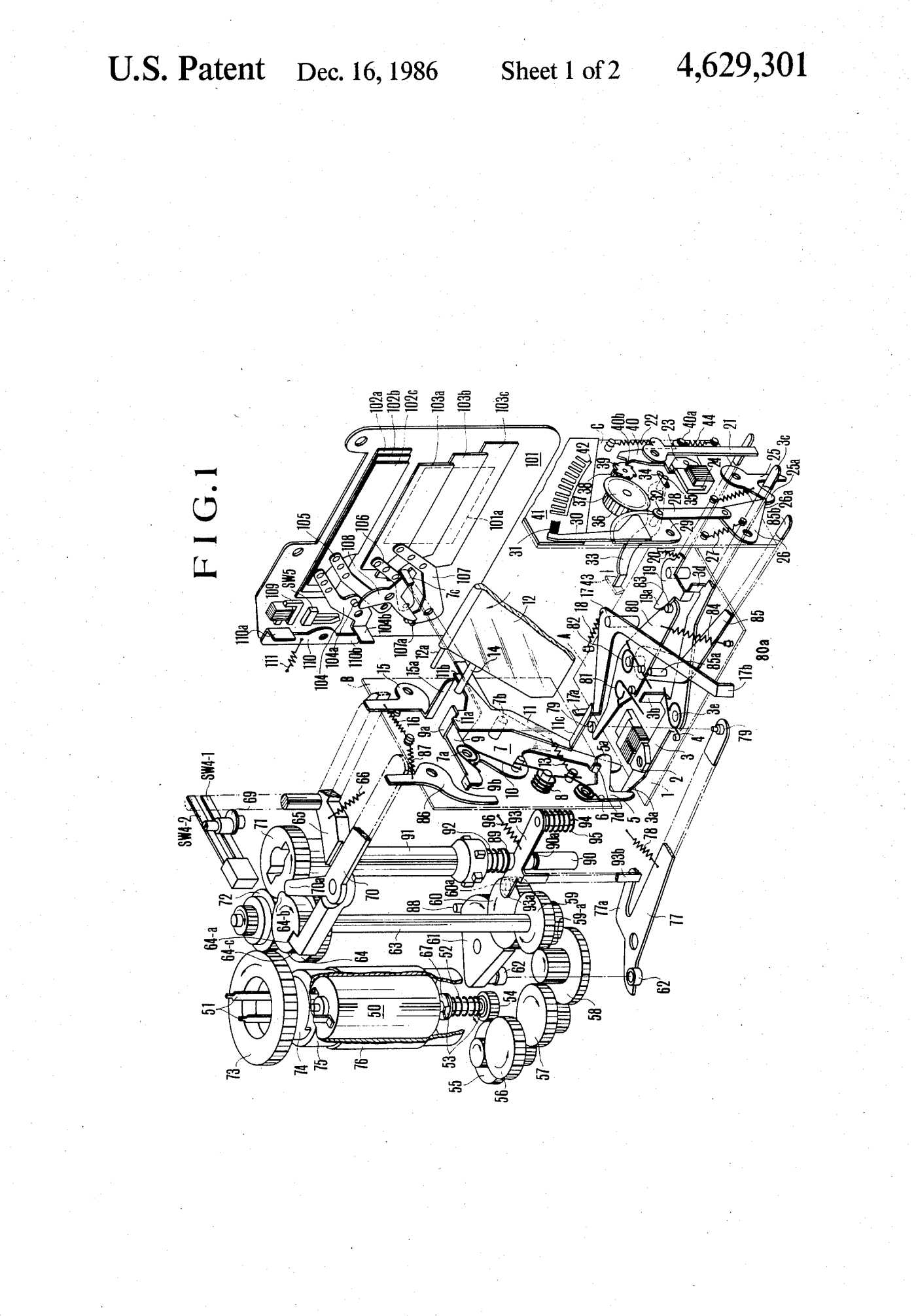
Figure 2:
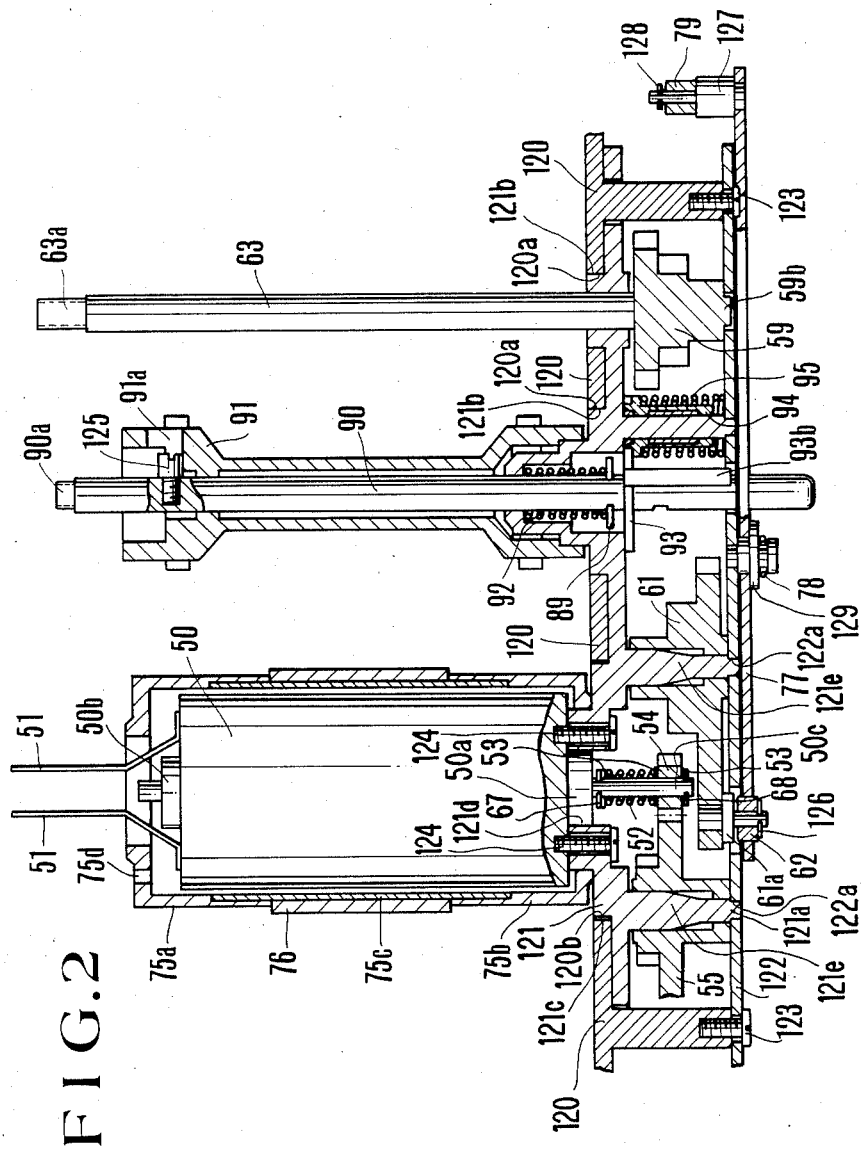
FIG. 2 is a sectional view showing in greater detail the winding part in FIG. 1, which is constructed as a unit.

FIG. 1 shows the internal mechanism of a camera to which the present invention is applied comprising a unit A for operating a diaphragm closing lever of a photographing lens (not shown), B being a mirror operating unit for a mirror reflecting light coming from the photographing lens to the finder optics bringing the mirror out of the photographing optical path only at the time of film exposure. A unit C controls the aperture of the photographing lens by determining the position of the aperture signal lever, with the drawing showing the state for effecting photographing operation. A release-type magnet unit 1 has a permanent magnet fixed on the unit A. An armature 2 is linked on a release lever 3, and the release lever 3 is urged in the counterclockwise direction by a spring 4, and has an upstanding part 3d to be engaged with a lever 19, the end part 3a to be engaged with a holding lever 5, the end part 3c to be engaged with a holding lever 25 and the upstanding part 3b. A spring 6 urges the holding lever 5 along the counterclockwise direction, and an energy storing lever 7 has an upstanding part 7d to be engaged with one end 5a of the holding lever 5, whereby at the end part 7a of the lever 7, the connecting lever 9 is rotatably linked. A strong energy storing spring 8 urges the energy storing lever 7 and a mirror lifting lever 11 along the counterclockwise direction, and the mirror lifting lever 11 is coaxially borne with the shaft 7b of the energy storing lever 7, whereby the lever 11 has an end part 11a to be engaged with one end 9a of a connecting lever 9 and an end 11c to be engaged with an upstanding part 17a of the automatic diaphragm lever 17.

A mirror 12 is carried on a shaft 12a, the drawing showing the position at which the photographing image is reflected to the finder optics. A pin 14 engages with one end 11b of the lever 11 in the course of rotation of the lever 11, the pin 14 being provided on the mirror 12. A wind stop release lever 15 having an upstanding part 15a is engaged with one end 11b of the lever 11, whereby the lever 15 is urged by the spring 16 along the counterclockwise direction. Further, the release lever 15 has an end part to be engaged with the end of the wind stop lever 65 urged by the spring 66 along the clockwise direction. A spring 18 urges the automatic aperture lever 17 having upstanding parts 17a and 17b along the counterclockwise direction. 33 is an aperture signal lever and 19 is a lever urged by a spring 20 along the counterclockwise direction, whereby a claw driving lever 21 is engaged with one end of the lever 19, being urged by the spring 22. 40 is a stop claw lever, on which there is provided a pin 40a, against which the lever 21 is in contact. The stop claw lever 40 is coaxial with the claw driving lever 21 and is rotatable, and on the lever 40 there is provided an armature 23 to be attracted by the magnet 24.

An aperture signal lever 43 of the photographing lens is shown in FIG. 1 at the position at which the diaphragm is totally opened, being urged along the direction of the arrow. The aperture signal lever 33 is engaged with the lever 43 and a pin 32 is provided on the aperture signal lever 33, whereby the pin 32 is rotatably fixed on the gear 29 and the connecting lever 28. A pin 35 is provided on the aperture signal lever 33, whereby the pin is freely put in the hole 34 in the base plate of the unit C. A lever 26 has one end rotatably linked with the connecting lever 28 and the other end 26a engaged with the end part 25a of the holding lever 25. A spring 27 urges the lever 26 along the counterclockwise direction. 36, 37, and 38 are gears, 39 is a stop wheel, 30 is a lever fixed on the gear 29, 31 is a brush fixed at one end of the lever 30, 42 is a toothed comb-shaped conductive pattern provided on the base plate 41, 44 is a lever for urging the stop claw lever 40 along the clockwise direction, 101 is a base plate having an exposure hole 101a, and 103, 103b, and 103c are leading shutter blades which are rotatably held by arms 106 and 107.

102a, 102b, and 102c are the tail shutter blades rotatably attached to the arms 104 and 105. The arms 104 and 107 are urged in the clockwise direction by a spring (not shown). 110 is the tail shutter blade holding lever having one end engaged with one end 104b of the arm 104. The arm 107 is provided with a similar leading shutter blade holding lever (not shown in the drawing). 111 is a lever for urging the lever 110 in the counterclockwise direction, and 108 is a charge lever engaged with a pin 104a on the arm 104 and a pin 107a on the arm 107, whereby the lever 108 is urged by a spring (not shown) along the counterclockwise direction. 109 is a tail shutter blade control magnet which attracts one end 110a of the holding lever 110 against the strength of the lever 111 when it is excited. SW5 is a normally opened switch, and SW4-1 and SW4-2 are switches operated by the wind stop lever 65, with SW4-1 being the count and motor current supply release switch, and SW4-1 being the brake switch. 50 is the winding motor, 51 is the motor contact having an end inserted into a flexible base plate (not shown), 52 is a first friction spring constituting the slip mechanism, 53 is a washer, 54 is a first gear, 55 is a second gear, 56 is a third gear, 57 is a fourth gear, 58 is a fifth gear, 59 is a winding gear, 67 is a holding washer, 60 is a notched gear, 61 is a sector gear, 77 is a connecting lever urged by a spring 78 in the counterclockwise direction, 62 is a roller in contact with the lever 77, 79 is a roller in contact with a main charge lever 80, 88 is a stopper, 63 is a winding shaft, and 64 is a winding stop gear, whereby the gear 64 has a notch 64a in which the winding stop lever 65 is engaged and a projection 64b which is engaged with the mirror release lever 70. 86 is a mirror release member urged by the spring 87 in the clockwise direction, 71 is a sprocket gear engaged with the winding stop gear 64, 72 is an idle gear, 73 is a spool gear, 74 is a spool friction spring, and 75 is a spool, whereby on the circumference of the spool 75, the friction rubber 76 for automatic loading is provided. 69 is a grounded contact of the switch SW4-1 with switch SW4-2, and adjusted in timing with an eccentricity.

66 is a spring for urging the winding stop lever 65 in the clockwise direction, 90 is a sprocket shaft, 91 is a sprocket, 92 is a sprocket spring, 93 is the R lock lever engaged in a notch 90a of the sprocket shaft 90, 94 is the R lock lever bearing, 95 is the R lock lever spring, and 83 is a pin engaged with the cam 19a of the lever 19, with the pin 83 being provided on the lever 80. 84 is a spring for urging the main charge lever 80 in the clockwise direction and 85 is the AE charge lever having the pin 85a.

FIG. 2 shows a part of the camera shown in FIG. 1, namely the section of the lower part of the winding mechanism constituted as a unit. In the drawing, 121 is a first winding base plate, 122 is a second winding base plate, 123 and 124 are screws, 125 is a clutch screw, 126 is a holding washer, 127 is a charge roller, and 128 is a holding washer. The assembly sequence of the winding mechanism will be explained hereinafter.

A row of the reduction gears is sandwiched between the first and second winding base plates 121 and 122, while several parts are fixed on the exterior part and the unit is put on the body 120 by the screw 123.

The bearing part 50a of the motor 50 is positioned by the first winding base plate 121 and fixed by the screw 124. Because the external diameter of the first gear 54 is smaller than that of the positioning hole of the first winding base plate 121, the friction spring 52, the washer 53, the holding washers 67, 68, and the first gear 54 can be mounted on the motor 50 before the motor 50 is mounted as described above. Further, at this time it is necessary to first mount the spool 75b to the base plate 121. The spool part is completed by mounting the spool 75c, the spool 75a and the friction rubber part 76. The reduction gear row having the second gear 55 at first, can be mounted, being allowed to fall on the shaft provided as one part on the first winding base plate 121 together with those gears omitted in FIG. 2. The roller shaft 61a is inserted into the sector gear 61.

The winding shaft 63 is put in the first winding base plate 121 and it is inserted into the winding gear 59 to which it can be fixed by a screw. Further, the projection 59b serves to prevent the falling down of the winding shaft 63 making use of the second winding base plate 122.

The R lock lever bearing 94 shown in FIG. 1 is mounted, being allowed to fall on the shaft of the first winding base plate 121. Also, the R lock lever spring 95 is mounted, being allowed to fall on the shaft on which the bearing 94 is mounted and finally pressed by the second winding base plate 122. After the holding washer 89 is built in, the sprocket shaft 90 is inserted in the first winding base plate 121, whereby the sprocket spring 92 is inserted. Thereafter, the sprocket 91 is mounted from the back side of the base plate and the clutch screw 125 is mounted on the sprocket shaft 90 through the clutch notch 91a of the sprocket 91. In this way, also the sprocket 91 is fixed into the same unit. Further, the falling of the sprocket shaft 90 is prevented by the second winding base plate 122. In a preparatory process, the connecting lever 77 is mounted on the second winding base plate 122 by calking the connecting lever shaft 128. 78 is the connecting lever returning spring, 127 is the charge roller shaft, and 129 is the holding washer.

As described above, the winding lower surface unit is completed by covering the first winding base plate 121, in which the parts are built, with the winding base plate 122. In FIG. 2, two base plates are fixed by pressing in the part 121a. Other fixing methods such as with heat calking are possible.

In the case of the winding lower surface unit constructed as mentioned above, the diameter of the hole by means of which the first winding base plate of the sprocket part and the spool part is connected with the main body is larger than the external diameters of the sprocket and the spool, so that mounting from beneath is facilitated. The winding lower surface unit can easily be positioned by making use of two of the three connecting parts of the main body 120 with the winding base plate 121. Further, comparatively greater strength is imparted to the connecting lever 77, because the second winding base plate 122 is fixed on the main body 120 by the screw 123 so that there exists a sufficient rigidity.

When the winding upper surface unit (not shown) is mounted in this state, the winding mechanism is completed.

In FIG. 2, the upper construction of the camera body is omitted.

The relationship of the winding upper surface unit (not shown) is such that the motor bearing 50b is connected to the positioning member (not shown). The motor contact 51 is inserted into the pad in the flexible member (not shown) so as to be conductive. In the notch 75d of the spool, the projection of the spool friction spring 74 in FIG. 1 is engaged. The end 90a of the sprocket shaft 90 is square shaped and the sprocket rotation body (not shown) for transmitting the rotation to the sprocket gear 71 in FIG. 1 is fixed on it by a screw. Also, the end 63a of the winding shaft 63 is square shaped so as to transmit rotation to the winding stop gear 64 in FIG. 1.

In the operation of the camera structured as described above, when the release button (not shown) is depressed by the photographer, current flows through the coil of the magnet 1 by the conventional control circuit and the armature 2 is no longer attracted. Thus, the release lever 3 is rotated around the shaft 3e by the spring 4 along the counterclockwise direction in such a manner that the lever 19 is disengaged from the upstanding part 3d of the release lever 3. At the same time, the holding lever 5 of the unit B is depressed by 3a and the holding lever 25 of the unit C by 3c so that the holding lever 5 is rotated by the release lever 3 against the strength of the spring 6 in the clockwise direction, whereby the energy storing lever 7 is disengaged from 5a and is rotated by the strong spring 8, while the mirror lifting lever 11 is rotated along the counterclockwise direction. The part 11b of the mirror lifting lever 11 is in contact with the pin 14 on the mirror in the course of the rotation so as to push up the pin 14 so that the mirror 12 is rotated along the direction of the arrow so as to be withdrawn out of the photographing optical path. Further, the part 11b of the level 11 is in contact with the one end 15a of the winding stop release lever 15 in the course of the rotation so as to push up the lever 15 so that the lever 15 is rotated against the strength of the spring 16 along the clockwise direction, and the winding stop lever 65 rotates against the spring 66 in the counter clockwise direction.

On the other hand, the lever 19 disengaged by the rotation of the release lever 3 is rotated by the spring 20 along the counterclockwise direction. Because the claw driving lever 21 of the unit C is urged by the spring 22 along the counterclockwise direction, when the lever 19 whose rotation is prohibited escapes as described above, the claw driving lever 21 is rotated until it is in contact with the pin 40a on the stop claw lever 40. Although the stop claw lever 40 is rotatable and coaxial with the claw driving lever 21, because the linked armature 23 is attracted by the magnet the lever 40 is not rotated even if the lever 21 pushes the pin 40a. When the release lever 3 rotates the holding lever 25 against the strength of the spring along the counter clockwise direction, the lever 26 is disengaged from the end part 25a of the holding lever 25 so that the aperture signal lever 33 is depressed downwards by the strength of the lens aperture signal lever 43 and the lever 26 is rotated against the strength of the spring 27 via the gear 29 and the connecting lever 28 along the clockwise direction.

The rotation of the gear 29 is transmitted to the stop wheel 39 via the gears 36, 37 and 38. Further, the lever 30 and the brush 31 fixed on the gear 29 rotate together with the gear 29. Thus, the brush 31 slides over the comb tooth shaped pattern 42, whereby the translation amount is detected as the variation of the voltage given to the pattern, namely as pulses. The pulses are counted by a conventional control circuit until the counter number of the pulses reaches the number corresponding to the precalculated proper aperture value, whereby the current flowing through the coil of the magnet 24 is interrupted. Thus, released from the magnet 24, the stop claw 40 is rotated by the spring 22 via the claw driving lever 21 and the pin 40a against the strength of the spring 44 along the counterlclockwise direction until the part 40b is in contact with the stop wheel 39 so as to stop the rotation of the stop wheel 39.

On the other hand, the other end 11c of the mirror lifting lever pushes the upstanding part 17a of the automatic diaphragm lever 17 of the unit A, so that along with the movement of the aperture signal lever 33, the automatic diaphragm lever 17 is rotated against the strength of the spring 18 along the clockwise direction. Because at this time the other end 17b of the automatic diaphragm lever 17 pushes the lever of the lens (not shown), the photographing lens is closed by the aperture signal lever 33 down to the predetermined aperture value as described above. The one end 7c of the energy storing lever 7 presses the charge lever 108 of the shutter, as will be explained hereinafter, in the charge completed state, whereby by the rotation along the counterclockwise direction, the end 7c is withdrawn out of the operative range of the charge lever and the shutter blades are ready to start operation by the operation of the shutter holding magnet.

The shutter starts to operate after a lapse of time sufficient for closing the diaphragm by a conventional control circuit.

Namely, when current is supplied to the leading shutter blade magnet (not shown) near the leading shutter blade holding lever (not shown), the leading shutter blade holding lever is attracted by the leading shutter blade magnet and rotated in the direction along which the leading shutter blade holding lever is disengaged from the arm 107, which is rotated by a spring (not shown) along the clockwise direction, whereby the leading blades 103a, 103b, and 103c are retired from the exposure window 101a so as to start the exposure of the film. After a lapse of time sufficient for obtaining the proper shutter time after the current supply to the leading shutter blade magnet by the conventional control circuit, current is supplied to the coil of the tail shutter blade magnet 109, whereby the one end 110a of the tail shutter blade holding lever 110 is attracted by the tail shutter blade magnet 109 and rotated against the strength of the spring 11 along the clockwise direction. Thus, the disengaged arm 104 is rotated by a spring (not shown) along the clockwise direction and the tail shutter blades cover the exposure window 101a so as to terminate the exposure of the film. Further, the one end 104b of the arm 104 pushes the normally opened switch SW5 so as to close it immediately before the operation termination.

At this time, the switches SW4-1 and SW4-2 are in the opened state by the winding stop lever 65 so that the current supply to the winding motor 50 is started. The rotation of the motor 50 is reduced in speed via the first gear 54, the second gear 55, the third gear 56, the fourth gear 57 and the fifth gear 58 and transmitted to the winding gear 59. The rotation power given to the winding gear 59 is transmitted to a charge system and a film feed system. Firstly, the charge system will be explained. Along with the rotation of the winding gear 59, the sector gear 61 is rotated via the notched gear 60.

The connecting lever 77 is operated by the roller 62 so as to charge the main charge lever 80 via the roller 79. When a certin determined amount has been charged, the connecting lever 77, the sector gear 61 and the notched gear 60 are reversed via the notch 59a of the winding gear 59 and the connecting lever returning spring 78 so as to be brought back up to the initial position determined by the stopper 88.

Below, the film feed system will be explained. The rotation of the winding gear 59 is transmitted to the winding stop gear 64 via the winding shaft 63. At this time, the winding stop lever 65 is disengaged from the notch 64a so that the winding stop gear 64 rotates.

At the beginning of the winding operation the mirror release member 86 is operated by the projection 64b via the mirror release lever 70 so as to lower the mirror. The rotation of the winding stop gear 64 is transmitted to the sprocket gear 71 so as to rotate the sprocket via the clutch mechanism (not shown). Then, the spool gear 73 is rotated via the idle gear 72. The spool gear 73 is provided with the spool friction spring 74 so as to rotate the spool 75 via the spring 74.

Shortly before the termination of the advancement of one picture frame, the winding stop lever 65 closes the SW4-1 by the action of the winding stop spring 66 which urges the lever 65 along the cam surface 64c of the winding stop gear 64 so as to interrupt the current supply to the motor. However, the motor 50 continues to run by inertia so that SW4-2 is closed so as to brake the motor electrically. After that, the winding stop lever 65 is engaged in the notch 64a of the winding stop gear 64 so as to complete the winding of a certain determined amount of the film. When the sprocket shaft 90 is pushed upwards at the time of the film winding after the determined number of pictures have been photographed, the R lock lever 93 is engaged in the notch 90a of the sprocket shaft 90. When the external force is removed in this state the sprocket spring 92 pushes the sprocket shaft 90 downwards via the holding washer 89.

At this time, the R lock spring 95 is compressed because it is weaker than the sprocket spring 92. Then, the R lock lever bearing 94 stops at the position determined by a stopper (not shown) provided at a certain determined position.

In this state, the sprocket gear 71 is disengaged from the sprocket 91 by the clutch mechanism (not shown). Because in this state the sprocket is free, the film can be rewound.

The R lock lever 93 has the release parts 93a and 93b, constituting a clutch reset mechanism for releasing the R lock lever 93 by the projection 60A of the notched gear 60 and the release part 77a of the connecting lever 77. These release parts operate only when the R lock lever is set. At the termination of the winding the direction of movement of the projection 60a is reversed and it resumes its initial position, when the release part 93a is pushed so as to disengage the R lock lever 93 from the sprocket shaft notch 90a.

Further, at the beginning of the winding the release part 93b is pushed by the release part 77a of the connecting lever 77 so as to disengage the R lock lever 93 from the sprocket shaft 90.

Below the operation of the units A, B, C and the shutter charge will be explained. By the above described roller 79 the main charge lever 80 is rotated against the strength of the spring 84 along the counterclockwise direction. The pin 83 provided at one end of the main charge lever 80 pushes the cam part 19a of the lever 19 so as to rotate the lever 19 against the strength of the spring 20 along the clockwise direction. Along with rotation of the lever 19, the claw driving lever 21 rotates against the strength of the spring 22 in the clockwise direction. Although, being urged by the spring 22 the stop claw lever 40 tries to rotate due to the spring 44 along the clockwise direction, because the lens aperture signal lever 43 applies a force to the stop wheel, which is still engaged with the part 40b, the lever 40 does not rotate. When the main charge lever 80 is further rotated, the spring 82 provided on the lever 80 with a certain determined preset strength is in contact with the pin 85a provided on the AE charge lever 85 coaxially borne with the main charge lever 80 so as to continue to rotate the main charge lever 80 and the AE charge lever 85. The one end 85b of the AE charge lever 85 pushes the lever 26 so as to rotate the lever 26 along the counterclockwise direction. Along with this, the gear 29 is also rotated via the connecting lever 28 along the counterclockwise direction, whereby the aperture signal lever 33 pushes the lens aperture signal lever 43 up to the position at which the diaphragm is totally opened. Further, the stop wheel 39 rotates in the direction along which it is disengaged from the part 40b of the stop claw 40 so that the stop claw lever 40 is rotated by the spring 44 along the clockwise direction, whereby the armature 23 is pressed against the magnet 24. When the main charge lever 80 is further rotated, because the AE charge lever 85 is not moved the strength given to the spring 82 surpasses the preset strength so that the spring 82 absorbs the overrun of the main charge lever 80. The main charge lever 80 is provided by the spring 81 with a certain determined preset strength so as to push a part 3b of the release lever 3 and rotate the lever 3 against the strength of the spring 4 along the clockwise direction.

On the other hand, because in the case of the unit B as described above at the beginning of winding the mirror release lever 70 pushes the quick return lever 86 against the strength of the spring 87 the other end of the quick return lever 86 pushes the part 9b of the connecting lever 9 so as to rotate the lever 9 along the counterclockwise direction. Thus, the part 9a of the connecting lever 9 is disengaged from the part 11a of the mirror lifting lever 11, which lever is rotated by the spring 13 along the clockwise direction, whereby the winding stop lever 15 is quickly returned by the spring 16 to the initial position shown in the drawing, as is the mirror 12 by a spring (not shown) and the automatic diaphragm lever 17 by the spring 18. Thus, the closed diaphragm is totally opened before the aperture signal lever 33 has returned to the totally opened position. Further, although the winding stop lever 65 is rotated by the spring 66 along the clockwise direction, because the winding stop gear 64 has already rotated the lever 65 is not engaged in the notch 64a and the end slides over the circumference of the winding stop gear 64.

The main charge lever 80 pushes one end of the energy storing lever 7 in the charge course so as to rotate the energy storing lever 7 against the strength of the spring 8 along the clockwise direction. Because at this time the one end 7c of the energy storing lever 7 rotates the shutter charge lever 108 along the clockwise direction, the arms 104 and 107 are rotated to the left via the pins 104a and 107a against the strength of a spring (not shown) so as to be engaged with the blade holding lever (not shown) and rotated a little further so as to be stopped. The shutter blades also resume the original position. Also the connecting lever 9 is again engaged with the mirror lifting lever 11 by the spring 10. At this time, the release lever 3 is rotated to the right by the spring 81, the armature 2 is attracted by the magnet unit 1. Although the main charge lever 80 is further rotated, the overrun of the lever 80 is absorbed by the spring 81. Then, the holding levers 5 and 25 resume the engaged state. At the end of the winding, the connecting lever 77 is rotated in the counterclockwise direction by the spring 78, the main charge lever 80 is returned to the position shown in the drawing by the spring 84, returned to the position shown in the drawing by the spring 84, and the AE charge lever 85 returns, being pushed by the part 80a of the main charge lever 80, whereby the photographing ready state in FIG. 1 is restored. Because at this time, the arms 104 and 107 are not held by the blade holding lever but the charge lever 108, there is no danger that the shutter blades start to run even if the blade holding lever moves by a shock, force or the like.

As described above, in accordance with the present invention, the winding mechanism is constructed as a unit so that it is possible to build the mechanism in the camera body very easily in such a manner that the assembly time can be reduced remarkably with the result that the camera cost can be largely reduced, which is very advantageous.

While a specific embodiment of the invention has been shown and described in detail to illustrate the application of the inventive principles, it will be understood that the invention may be embodied otherwise without departing from such principles.

What We claim is:

1. A camera having an electrically driven winding mechanism, comprising:

a camera body having a positioning part;

a first base plate which is positioned at said positioning part of said camera body and is fixed thereto, said first base plate having a motor mounting part and at least one shaft having a top end provided integrally therewith;

a second base plate spaced a distance from said first base plate attached to said camera body, said second base plate having at least one hole into which said top end of said shaft is inserted;

said shaft being arranged to accurately maintain the distance between said first base plate and said second base plate with said shaft being held against inclined displacement thereof by said insertion of said top end into said hole in said second base plate;

a driving motor which is mounted on said motor mounting part of the first base plate and is fixed thereto, said driving motor having a driving shaft which has at least a portion thereof located between said first base plate and said second base plate;

a first gear attached to said driving shaft; and a second gear which is provided between said first base plate and said second base plate and at the same time at the shaft of said first base plate in a rotatable manner, said second gear being operatively associated with said first gear for transmitting the driving force of said driving motor.

2. A camera according to claim 1, wherein said top end of the shaft of the first base plate inserted into the hole of the second base plate is fixed to said second base plate by a hot calking connection.

* * * * *